United States Patent [19]
Burrell et al.

[11] Patent Number: 5,626,320
[45] Date of Patent: May 6, 1997

[54] MOUNTING BRACKET FOR USE WITH AIRCRAFT YOKES

[75] Inventors: Jonathan C. Burrell, Olathe; Christopher J. Hanshew, Lenexa, both of Kans.

[73] Assignee: Garmin Corporation, Olathe, Kans.

[21] Appl. No.: 366,980

[22] Filed: Dec. 30, 1994

[51] Int. Cl.$^6$ ................................................. A47B 96/06
[52] U.S. Cl. ........................... 248/230.6; 248/227.4; 248/231.31; 248/292.12; 248/911
[58] Field of Search ................. 248/227.4, 230.6, 248/231.71, 286.1, 292.12, 911, 913

[56] References Cited

PUBLICATIONS

*Quick–Clamp*™ *Instruction Manual*, Autel Corporation, Sunnyvale, California, 1982.
*Adapter–Arm for Mounting Garmin GPS55 Personal Navigator*™ *on Quick–Clamp*™ *Yoke Mount*, Autel Corporation, Sunnyvale, California, 1992.

*Primary Examiner*—Derek J. Berger
*Assistant Examiner*—Richard M. Smith
*Attorney, Agent, or Firm*—Kokjer Kircher Bowman & Johnson

[57] ABSTRACT

An instrument mounting bracket for the control yoke of an aircraft. The mounting bracket includes a main body having a C-shaped configuration which is intended to receive the yoke. Mounted to the main body is a presser plate which acts in conjunction with the main body to grip the yoke therebetween. The main body also includes a pair of threaded attachment holes, with one hole being normal to the plane of the C-shape and the other being within such plane. Either hole may receive a threaded shaft having an enlarged section. An extension arm which includes a mount for the instrument is provided with a through hole for the threaded shaft. Passing the shaft through the extension arm and tightening it within one of the attachment holes secures the extension arm to the main body, and permits angular adjustment of the arm with respect to the body. The extension arm may thus be positioned such that the instrument mount is located in front of the yoke handles, readily accessible to the user.

17 Claims, 2 Drawing Sheets

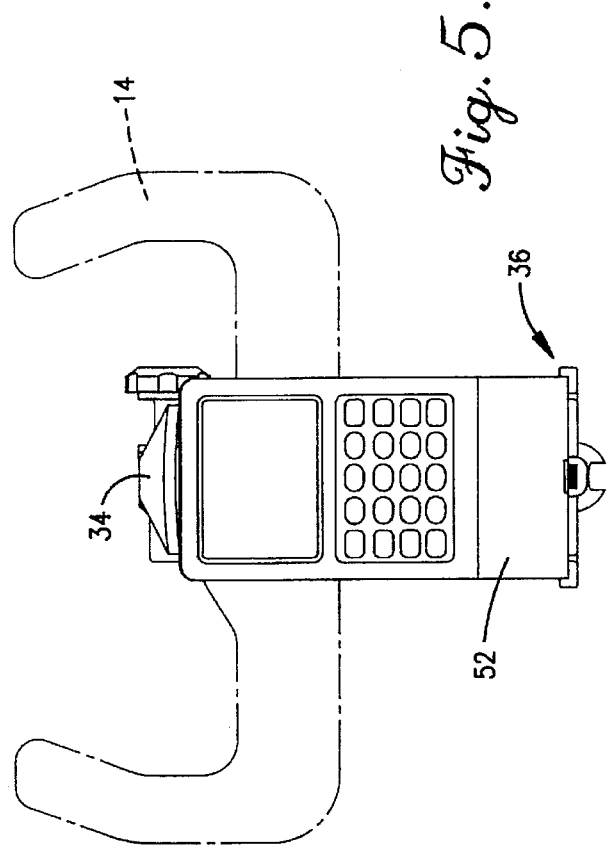
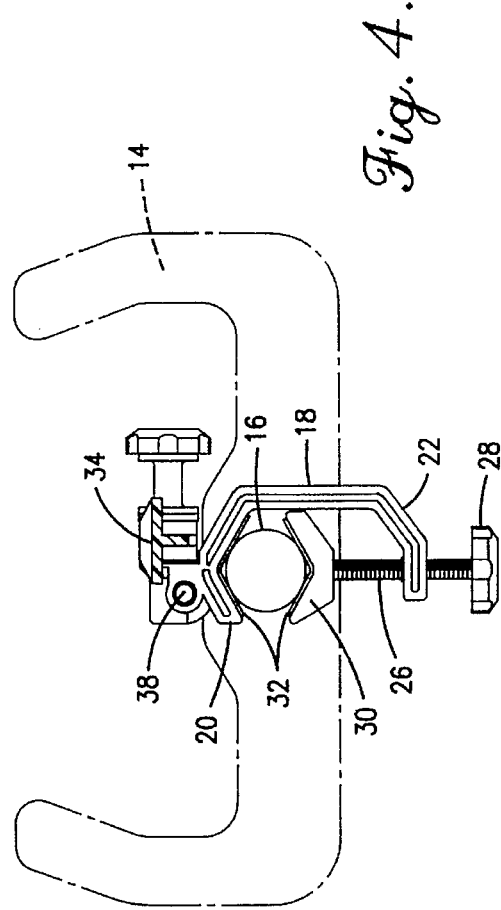
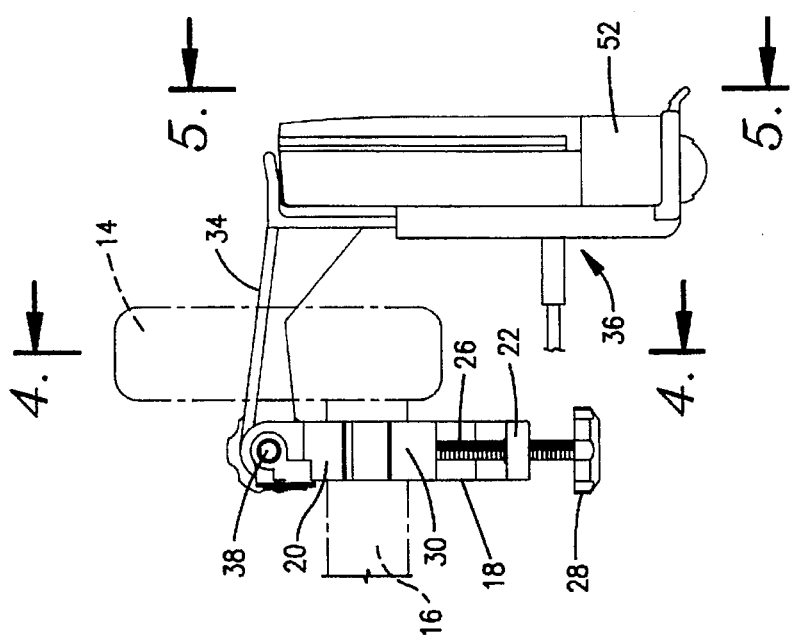

5,626,320

MOUNTING BRACKET FOR USE WITH AIRCRAFT YOKES

BACKGROUND OF THE INVENTION

1. Field of the Invention

The present invention relates in general to retrofit aircraft instrumentation packages. In particular, the present invention relates to an improved bracket for mounting instruments to the yoke of an aircraft.

2. Description of the Related Art

In recent years there have been developments in electronics which have provided various affordable instruments which are very advantageous for use in aircraft. A good example of this is the development of hand-held navigational aids combining global position sensing via satellite with computerized course tracking, plotting, etc. These developments move at a much faster rate than aircraft obsolescence, and as such there is a desire to provide these new instruments to existing aircraft.

One known method of retrofitting an aircraft with a new instrument is to mount the instrument to the control yoke of the aircraft via a mounting bracket. While this is a simple task in the abstract, in practice the variation in yoke design between the most prevalent brands of aircraft make it difficult to devise a mounting bracket which fits a wide variety of aircraft models and which does not require extensive modification for use on different models.

SUMMARY OF THE INVENTION

An object of the present invention is to provide a mounting bracket for mounting of an instrument to the control yoke of an aircraft.

Another object of the present invention is to provide such a yoke which may be used with the largest possible number of the different existing models of aircraft.

Yet another object of the present invention is to provide such a mounting bracket which requires only minor adjustment for use on aircraft having different yoke configurations.

A further object of the present invention is to provide such a mounting bracket which does not require removal, modification or substitution any parts of the aircraft to install the bracket.

Yet another object of the present invention is to provide such a mounting bracket which does not require special tools to mount or dismount the bracket.

These and other objects are achieved by an instrument mounting bracket for the control yoke of an aircraft. The mounting bracket includes a main body having a C-shaped configuration which is intended to receive the yoke. Mounted to the main body is a presser plate which acts in conjunction with the main body to grip the yoke therebetween. The main body also includes a pair of threaded attachment holes, with one hole being normal to the plane of the C-shape and the other being within such plane. Either hole may receive a threaded shaft having an enlarged section. An extension arm which includes a mount for the instrument is provided with a through hole for the threaded shaft. Passing the shaft through the extension arm and tightening it within one of the attachment holes secures the extension arm to the main body, and permits angular adjustment of the arm with respect to the body. The extension arm may thus be positioned such that the instrument mount is located in front of the yoke handles, readily accessible to the user.

BRIEF DESCRIPTION OF THE DRAWINGS

The objects and features of the invention noted above are explained in more detail with reference to the drawings, in which like reference numerals denote like elements, and in which:

FIG. 3 is a side view of the bracket of FIG. 1;

FIG. 4 is a cross-sectional front view along line 4—4 of FIG. 3; and

FIG. 5 is a front view along line 5—5 of FIG. 3.

DETAILED DESCRIPTION OF THE INVENTION

Figure 1:
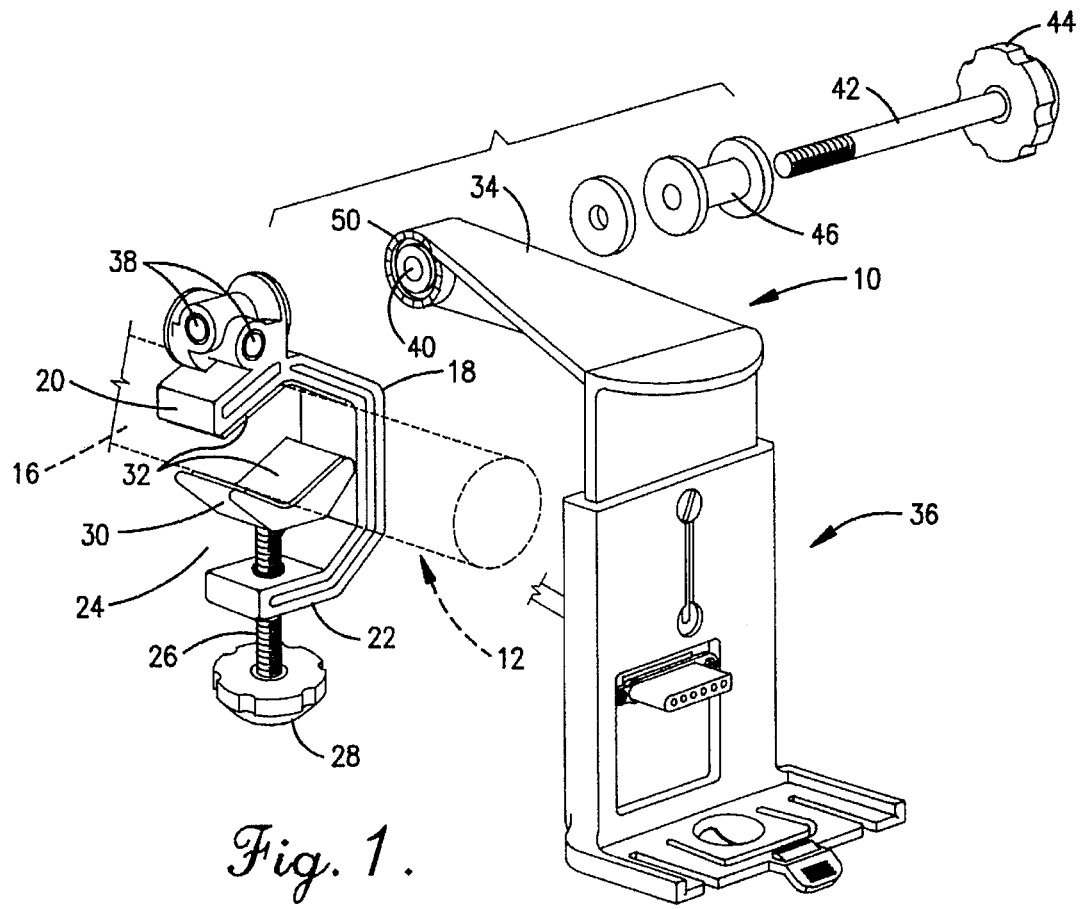
FIG. 1 is an exploded perspective view of the bracket of the present invention in a first mounting configuration.

With reference to FIG. 1, a mounting bracket according to the present invention is generally designated by reference numeral 10. The bracket 10 is to be used with a general aircraft control yoke, generally indicated by reference numeral 12. The yoke 12 generally includes a control wheel or handle 14 (FIGS. 3–5) for the pilot to manually grasp. The handle may take various configurations, but the U-shaped configuration shown is quite common. The handle section is mounted upon the free end of a control shaft 16.

The control shaft may be one of two types, offset or central. Offset control shafts extend generally directly away from the pilot, as illustrated in FIGS. 1 and 3–5, and are mounted behind the control panel (not shown). Central control shafts extend laterally of the pilot before making a 90° bend (not shown) near the centerline of the aircraft, and thereafter extend to a mount behind the control panel (not shown), with the laterally extending portion being shown in FIG. 2. The mounting bracket of the present invention may be used with either control shaft type. In either arrangement the size and shape may vary depending upon the particular model of aircraft.

Figure 2:
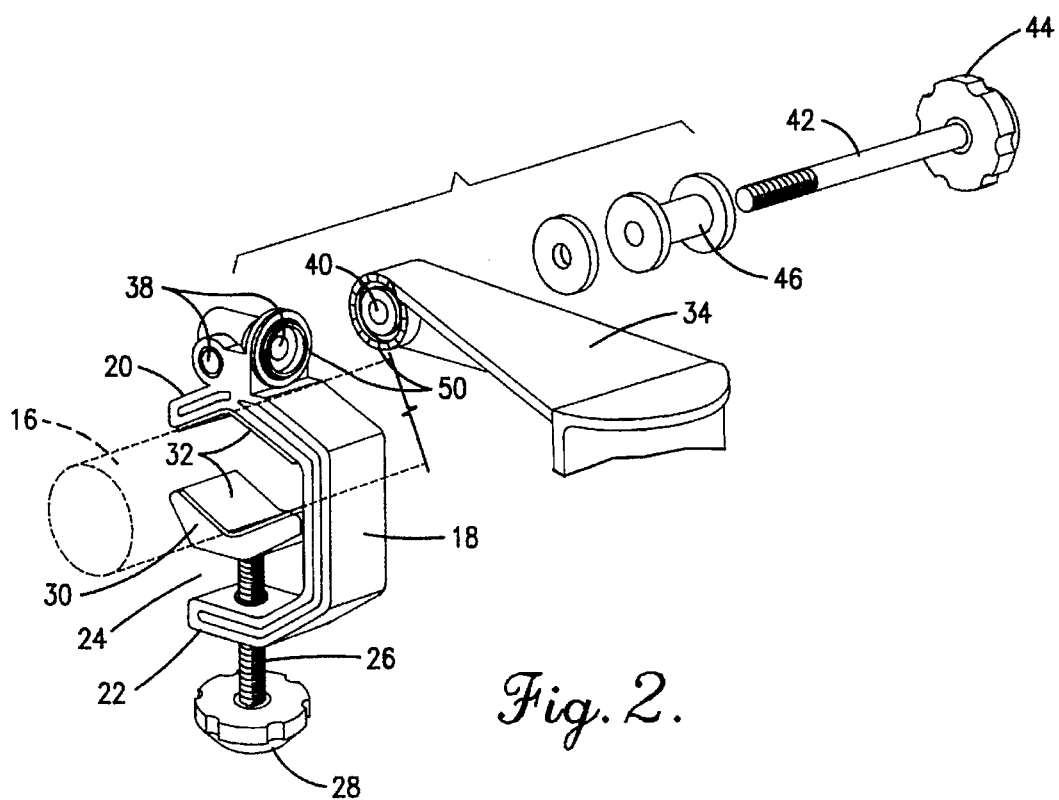
FIG. 2 is an exploded perspective view of the bracket of the present invention in a second mounting configuration.

With reference to FIGS. 1 and 2, the mounting bracket 10 includes a main body 18 having a generally C-shaped configuration with an upper free leg 20 and a lower free leg 22 spaced to define an opening 24. The opening 24 is sized to at least partially receive the shaft, and as such will have a size sufficient to receive at least a very large percentage of control shaft diameters. The main body may be formed of any sufficiently rugged material, such as plastic or metal.

The lower leg 22 includes a threaded hole (not shown) extending vertically therethrough, and received within this hole is a threaded main shaft 26. The main shaft 26 is rigidly fitted with a main knob 28 at its lower end. As may be envisioned, manual rotation of the main knob will thus cause the main shaft 26 to rotate within the lower leg 22 to advance toward or away from the upper leg, depending upon the direction of rotation of the shaft.

The upper end of the main shaft 26 mounts a presser plate 30. The presser plate 30 is mounted to the shaft for relative rotation about the longitudinal axis of the main shaft. Various known arrangements may be used to achieve this rotation. In the preferred form (not shown), the upper end of the main shaft includes a reduced diameter section which is not threaded. This reduced diameter section includes a threaded hole extending into the main shaft along its longitudinal axis. The presser plate 30 will include a mounting hole which will receive the reduced diameter section of the shaft, but not the remaining threaded section. The mounting hole will be counterbored to form a shoulder on its upper face. When the presser plate is placed on the main shaft a mounting bolt having an enlarged head (and possibly a washer) may be received in the threaded end of the main shaft and lightly seated against the shoulder of the presser plate. The enlarged head of the bolt will retain the presser plate on the main shaft, while the presser plate is free to rotate about the reduced diameter section.

With this arrangement the rotation of the main knob 28 may be used to advance the presser plate 30 toward the upper leg 20, thus securing the control shaft 16 between the presser plate 30 and the upper leg 20. The presser plate preferably has an upwardly concave form, such as shown in the figures. Similarly, the upper leg 20 of the main body may have a downward concave form, also as shown. This arrangement will permit greater surface area contact between the upper leg and presser plate and the (typically) circular control shaft 16. For greater stability, elastic pads 32 for gripping may be provided on the opposing surfaces of the upper leg and presser plate.

The arrangement described above for mounting the presser plate 30 to the main shaft 26 may also be used to permit adjustment for control shafts 16 of different sizes and shapes. In particular, the mounting bolt could be removed, and the entire main shaft 26/main knob 28 assembly unscrewed from the lower leg. Thereafter, a different main shaft 26/main knob 28 assembly having a different length could be threaded into the lower leg, and the presser plate reapplied. Such different lengths of main shafts 26 would therefore permit a wider variation in use of the bracket 10.

From the arrangement described above, it may be readily seen that the main body 18 may be easily mounted to the control shaft 16 of the yoke. This is true regardless of whether the control shaft 16 is of the offset or the central variety. However, the main body 18 will be oriented 90° offset between these two yoke types, as is shown by comparison of FIGS. 1 and 2. In particular, a plane which includes the C-shape of the main body will be generally normal to the longitudinal axis of the control shaft 16 (at least at the point of attachment of the bracket 10).

The mounting bracket 10 also includes an extension arm 34 having a first end secured to the main body 18, and a second end which includes or supports an instrument mount, generally indicated by reference numeral 36 (FIG. 1).

To secure the extension arm to the main body, the main body includes a pair of threaded mounting holes 38. The longitudinal axes of the mounting holes extend perpendicular to each other, with the mounting holes preferably being vertically spaced to avoid intersection between the holes. The perpendicular mounting holes are oriented such that the longitudinal axis of one mounting hole is within the plane of the C-shaped main body, while the other mounting hole is substantially normal to such plane. As such, when the main body 18 is mounted to the control shaft 16, one of the mounting holes will extend substantially perpendicular to the longitudinal axis of the control shaft, regardless of whether the yoke is of the offset or central variety. This is seen by comparison of FIGS. 1 and 2.

The first end of the extension arm 34 which is secured to the main body 18 is provided with a non-threaded pass hole 40 (FIGS. 1 and 2). Further, the bracket 10 includes a threaded secondary shaft 42 having fixed to its outer end a secondary knob 44. As may be envisioned, the secondary shaft 42 may pass freely through the pass hole 40 in the extension arm, and be threaded into one of the mounting holes 38 on the main body. Sufficient manual rotation of the knob 44 will cause the knob to abut against the extension arm, and will press the arm between the knob 44 and the mounting hole 38, thus clamping the arm in place.

To ease this operation, it is preferred that the secondary shaft be provided with an enlarged section 46 adjacent the knob 44. This enlarged section may be an extension of the knob 44, or a separate element as shown in FIGS. 1 and 2. Additionally, it may be desirable to provide a washer 48 between the mounting hole 38 and the knob 44/enlarged section 46. The use of the enlarged section will serve to space the knob from the extension arm, thus permitting easier manual rotation of the knob, and thus easier use.

As is seen by comparison of FIGS. 1 and 2, the extension arm may be mounted to the main body via either of the mounting holes 38. The particular hole used will depend upon the yoke arrangement of the aircraft. As shown in FIG. 1, for offset yoke aircraft the extension arm will be mounted to the hole 38 which is within the plane of body 18, such that the second end of the extension arm extends generally normal to such plane. As shown in FIG. 2, for central yoke aircraft the extension arm will be mounted to the hole 38 which is normal to the plane of body 18, such that the second end of the extension arm extends generally within such plane.

In use the extension arm may tend to rotate downward under weight. To prevent this, there may be provided a set of interlocking teeth 50 on the extension arm and main body about the mounting holes. Other arrangements such as knurling could also be employed. It is noted in this regard that the use of the secondary shaft and mounting holes to secure the extension arm permits the arm to be located at various angles with respect to the main body, which permits the bracket 10 to be employed with a larger number of aircraft models having various sizes of control handles.

With these mounting arrangements of the extension arm, the second end of the arm will be positioned such that the instrument mount 36 is conveniently located with respect to the pilot, yet does not obscure the original instrument panel. For the offset yoke aircraft shown in FIGS. 1 and 3–5, the second end of the arm extends over the control handle 14, such that the instrument mount is located intermediate the pilot and the handle. This is best shown in FIGS. 3 and 5. For central yoke aircraft, the second end of the extension arm will be located laterally interior of the control handle 14. In other words, the control handle would be located on the left end of the control shaft 16 in FIG. 2, just beyond the extension arm.

As noted above, the second end of the extension arm 34 includes, or supports, the instrument mount 36. The particular instrument mount will of course depend upon the instrument which is to be mounted. In the figures, the instrument is generally designated by reference numeral 52, and takes the form of a global position sensor/navigation computer combination, such as are commercially available. For this instrument 52, the extension arm 34 forms the upper end of the instrument mount, with the remainder of the mount formed by other elements which do not form part of this invention, and which are commercially available. Where the extension arm does not form part of the mount 36, the second end of the arm could include a various arrangements for supporting the mount, such as mounting holes, tabs, slots, etc.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A mounting bracket for a control yoke of an aircraft, such control yoke including a control shaft and a control handle on said shaft, said mounting bracket supporting an aircraft instrument mount, comprising:

a main body constructed and arranged to be selectively mounted to the control shaft, said main body including two identical mounting holes, when said main body is mounted on said control shaft a first of said identical mounting holes extending substantially parallel to a longitudinal axis of the control shaft and a second of said identical mounting holes extending substantially perpendicular to said first mounting hole;

an extension arm having a first end including a pass hole extending therethrough and a second end for supporting the instrument mount; and a bolt extending through said pass hole of said extension arm end being engaged within one of said identical mounting holes, said bolt including an enlarged portion abutting against said extension arm with said extension arm intermediate said main body and said enlarged section, such that said extension arm is mounted to and extends from said main body.

2. A mounting bracket as in claim 1, wherein said second end of said extension arm comprises a portion of the instrument mount.

3. The mounting bracket as in claim 1, wherein said extension arm is elongated and includes a second free end, and wherein said instrument is supported at said second end.

4. The mounting bracket as in claim 3, wherein said second end of said extension arm comprises a portion of the instrument mount.

5. The mounting bracket as in claim 1, wherein there are provided interlocking teeth surrounding each of said mounting holes and said pass hole.

6. The mounting bracket as in claim 5, wherein said second end of said extension arm comprises a portion of the instrument mount.

7. The mounting bracket as in claim 1, wherein said main body is C-shaped with upper and lower legs and an opening defined between said legs, a plane containing said C-shaped body being substantially normal to said longitudinal axis of said control shaft when said body is mounted thereon.

8. The mounting bracket as in claim 7, wherein said main body further includes a main shaft threaded through said lower leg and extending toward said upper leg, and a presser pad mounted on said main shaft within said opening in opposed relation to said upper leg, said upper leg and said presser pad acting to selectively clamp the control shaft therebetween.

9. The mounting bracket as in claim 8, further comprising a manual knob on said main shaft opposite said presser pad, and elastic material on said upper leg and said presser pad in opposed relation, and wherein said presser pad has an upwardly concave configuration.

10. The mounting bracket as in claim 9, wherein there are provided interlocking teeth surrounding each of said mounting holes and said pass hole.

11. The mounting bracket as in claim 10, wherein said second end of said extension arm comprises a portion of the instrument mount.

12. A mounting bracket in combination with a control yoke of an aircraft, such control yoke including a control shaft having a longitudinal axis and a control handle on said shaft, said mounting bracket supporting an aircraft instrument mount, comprising:

a main body constructed and arranged to be selectively mounted to the control shaft;

an elongated extension arm having a first end and a second end; and means for selectively mounting said extension arm in a first or a second position, in said first position said extension arm extending substantially parallel to the longitudinal axis of said control shaft and in said second position said extension arm extending substantially perpendicular to said longitudinal axis of said control shaft.

13. The combination as in claim 12, wherein said main body is C-shaped with upper and lower legs and an opening defined between said legs, a plane containing said C-shaped body being substantially normal to said longitudinal axis of said control shaft when said body is mounted thereon.

14. The combination as in claim 13, wherein said main body further includes a main shaft threaded through said lower leg and extending toward said upper leg, and a presser pad mounted on said main shaft within said opening in opposed relation to said upper leg, said upper leg and said presser pad acting to selectively clamp the control shaft therebetween.

15. The combination as in claim 14, further comprising a manual knob on said main shaft opposite said presser pad, and elastic material on said upper leg and said presser pad in opposed relation, and wherein said presser pad has an upwardly concave configuration.

16. The combination as in claim 15, wherein said second end of said extension arm comprises a portion of the instrument mount.

17. The combination as in claim 12, wherein said second end of said extension arm comprises a portion of the instrument mount.

* * * * *